May 29, 1956　　　M. V. BROWN　　　2,747,637
GOLF CART COVER

Filed Feb. 17, 1954　　　　　　　　　2 Sheets-Sheet 1

INVENTOR
MARY VIRGINIA BROWN
BY
ATTORNEY

May 29, 1956 M. V. BROWN 2,747,637
GOLF CART COVER
Filed Feb. 17, 1954 2 Sheets-Sheet 2
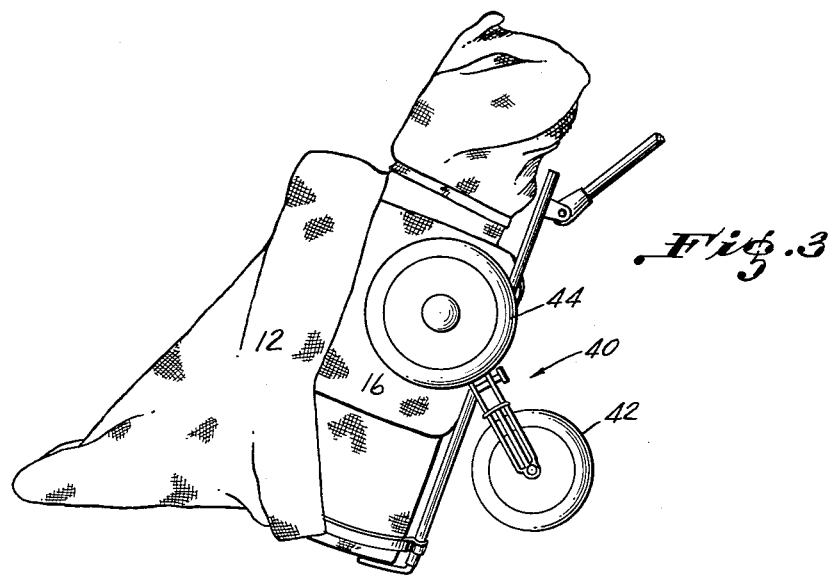
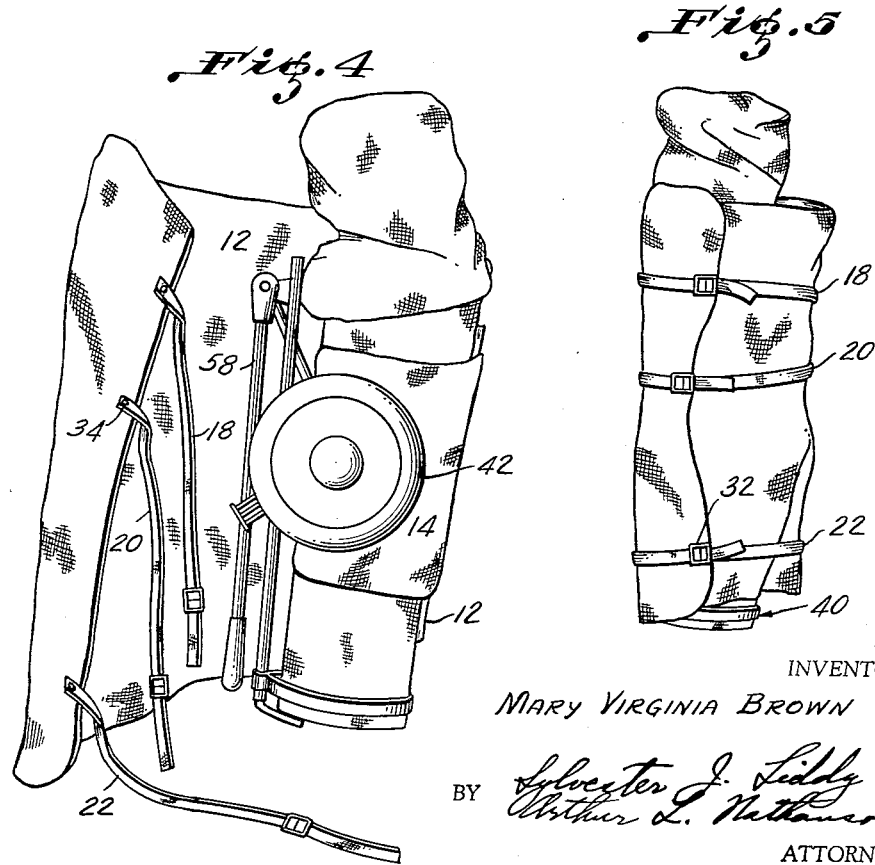
INVENTOR
MARY VIRGINIA BROWN
BY
ATTORNEY

United States Patent Office 2,747,637
Patented May 29, 1956

2,747,637
GOLF CART COVER

Mary Virginia Brown, Missoula, Mont.

Application February 17, 1954, Serial No. 410,876

1 Claim. (Cl. 150—52)

This invention relates to covers and in particular relates to a covering device for forming a package with a golf cart.

Many golfers are using golf carts for carrying their bags around the course. These carts comprise at least a pair of wheels and a stand or support on which the bag is mounted. The golfer usually keeps his bag attached to the cart when going around the course and when carrying the cart to and from home. As can be expected the carts pick up an amount of dirt depending upon conditions of the field. After rainy weather a considerable amount of mud is picked up. This results in soiled hands and clothes in picking up the cart and the carrying of the dirt into an auto trunk or back seat where it is deposited on the upholstery, carpeting or other luggage. It is accordingly an object of this invention to provide a cover for golf carts with which this undesirable characteristic of the handling of golf carts is overcome. Through the use of a cover constructed in accordance with my invention a golf cart can be placed in an automobile or carried without the transfer of dirt from the cart wheels, etc. to clothing or to the automobile.

The golf carts used today are predominately of the type in which the wheels collapse alongside the golf bags. When the wheels are in this position they mar, soil and rub the sides of the bags often damaging them permanently. It is therefore another object of my invention to provide a cover for forming a package with a golf cart particularly of the collapsible wheel type, through use of which the marring of the bag usually attached to the cart is prevented.

Still another object of my invention is to provide a cover for golf carts which may be easily applied to form a package with the golf cart without soiling the clothes of the user of the golf cart.

A further object of the invention is to provide a cover for articles such as golf carts which can be applied to the cart while the cart is still on the ground.

Among other objects of my invention are to provide a cover which is of simple, yet durable construction, to provide a cover which can be cheaply manufactured and sold for a reasonable price and to provide a cover which may be readily carried or stored.

Figure 1:
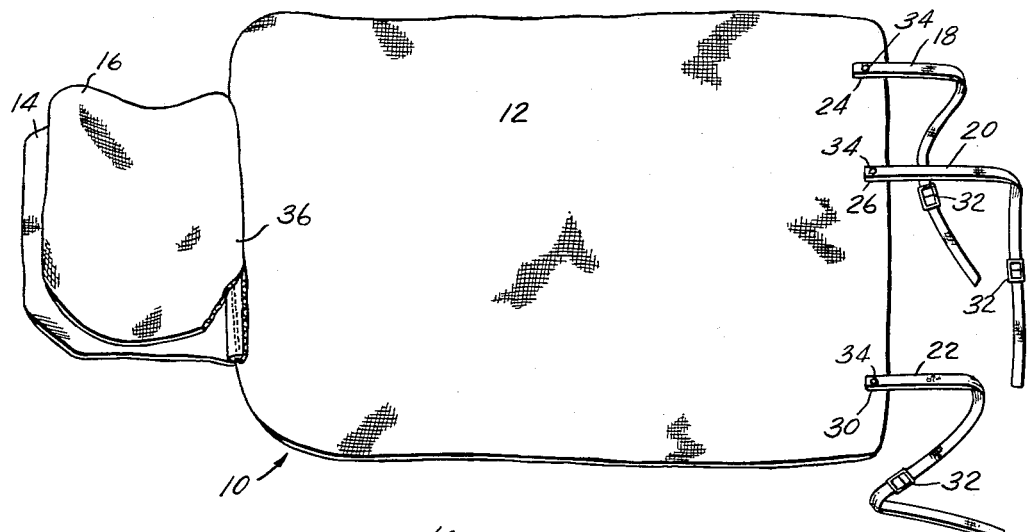
Figure 2:
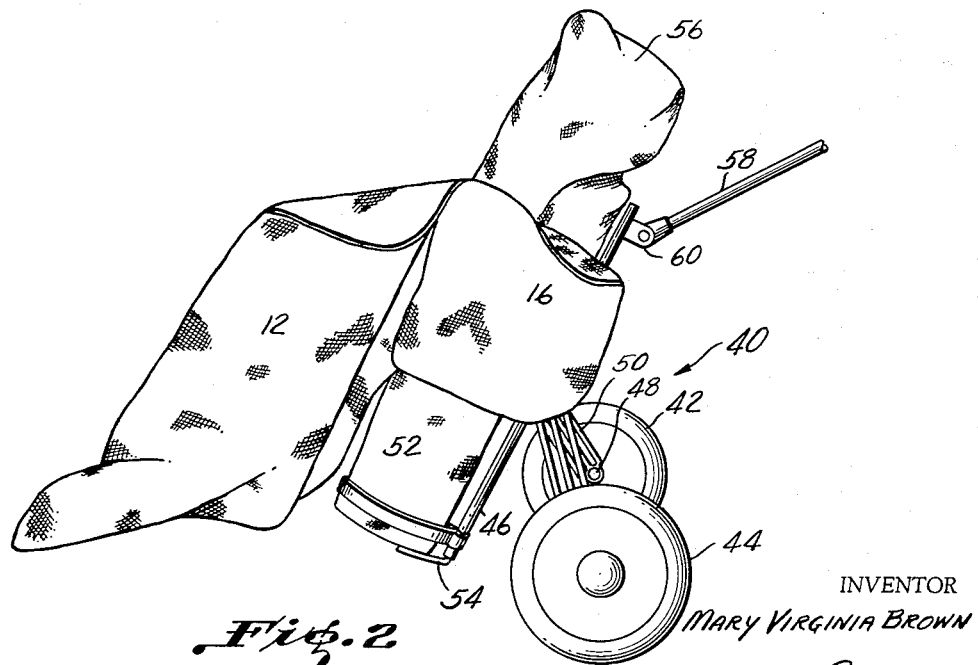

These and other objects and advantages will become apparent from the following description and the accompanying drawings in which:

Figure 1 is a perspective elevational view of a cover formed in accordance with the invention, Figure 2 is a perspective view showing the first step in applying a cover constructed in accordance with the invention to a golf cart of the collapsible wheel type, Figure 3 is a view similar to Figure 2 showing the second step in applying the cover, Figure 4 is a perspective view showing the third step in forming the package comprising the golf cart, bag and cover, Figure 5 shows a package formed in accordance with my invention.

Similar reference characters in the several views represent similar elements.

Referring now in particular to the drawings, reference character 10 denotes a cover having a main body portion 12 and a protector portion, which in the embodiment shown for purposes of illustration comprises two lapping flaps 14 and 16 secured at corresponding edges to the main cover portion 12 and extending therefrom. At one end of the body the pair of wing-like flaps 14 and 16 are attached to the edge or adjacent the edge. These flaps may be formed of a single continuous piece of material attached to the edges of the body 12 in such a manner as to form the two wing-like flaps. The flaps are adapted to normally extend parallel to each other outwardly from the body 12. It should be noted that the flaps can be folded back on opposite sides of the body 12 and then the cover can be folded or rolled into a compact size for convenience in storage or carrying. These flaps can form guards for a golf bag which is used with a golf cart as described hereinafter. In any event they serve as anchoring means for adapting the cover to an article to be wrapped within the cover body 12. By placing the anchor flaps around the edges of an article to be covered and securing these flaps either to each other, or to the article in such a manner that the article is at least partially received between the two flaps, the body 12 can then be folded around the article and pulled reasonably taut to form a satisfactory package. By "satisfactory package" is meant one in which the desired covering is obtained and in which the cover is not loose and will not fall off.

Fastening means are secured to the body 12 at the end opposite the end to which the flaps 14 and 16 are connected. In the preferred form of the cover, adapted for use with a collapsible wheel golf cart, it is seen that the cover has an upper strap 18, an intermediate strap 20 and a lower strap 22 fixedly secured to body 12 at their ends 24, 26 and 30 by means of stitching, riveting, or other suitable means. Each of the straps is provided with an adjustable snap fastener element 32 which can be moved along the strap to adjust its position. Each snap 32 is adapted to cooperate with a mating snap member 34 secured to the end of the strap affixed to the body 12. The straps can be formed of strips of elastic tape, thus providing tension which will assist in forming a satisfactory package.

Figures 2 to 5 illustrate the method of forming a package with the cover of Figure 1. Reference character 40 designates a golf cart. The cart has a pair of wheels 42, 44. The wheels are connected to the frame 46 by axles 48 and legs 50. The legs 50 are pivotally connected to the bag 46 and may be pivoted to a position in which wheel 44 is shown in Fig. 3. The golf bag 52 is shown to be supported on a platform 54. The bag is provided with the usual cover 56 for protecting the heads of the clubs. Handle 58 is pivotally connected to the frame at 60 and is used to push or pull the cart.

In forming the package the flaps 14 and 16 are wrapped over the golf bag and cart with the attaching seam 36 positioned centrally at the front of the golf bag.

Referring now to Figure 3 it is seen that the wheel 44 is then pivoted upwardly until it abuts against flap 16 and presses flap 16 against the golf bag. As normally constructed the golf cart wheel structure will impinge against the golf bag at some point at least. The opposite wheel 42 is then pivoted upwardly until it impinges flap 14 against the golf bag. Handle 58 is then pivoted downwardly to complete the collapsing of the cart. The body 12 of the cover is next wrapped around the cart and golf bag (see Fig. 4) and finally the straps 18, 20 and 22 are tightly stretched around the package and the fastener elements 32 joined to the cooperating fixed fastener elements of the cover.

From Figure 5 it is seen that there is thus provided a neat, compact package which can be readily picked up and placed in a vehicle. It is obvious that the cover could be left at the vehicle until the cart is brought there. When the cart is immediately adjacent the vehicle the cover can be removed from the vehicle and applied to the cart. The package can then be placed in the vehicle without damaging or dirtying the vehicle or other packages. It is also clear that the golfer will not have his clothing soiled. The cover can be cleaned whenever it is convenient.

The cover as shown is made out of a canvas or awning material, but it is obvious that any suitable flexible material, such as plastics may be used.

An important advantage of my invention, which is apparent from the drawings, is that the cover can be applied to the cart while the cart remains on the ground. With this feature it is unnecessary to pick the cart up, and there is obviously little likelihood that dirt will be transferred from the cart to the clothing or hands of the user.

While I have shown and described a preferred form of my invention, it will be understood that variations in details of form may be made without departure from the invention as defined in the appended claim.

I claim:

A cover comprising a flexible body portion adapted to be wrapped about an article, a pair of anchor flaps attached to said body adjacent one end thereof and adapted to extend outwardly of said body in facing relationship, fastening means secured to the opposite end of said body and comprising a strap extending outwardly therefrom, a fastener element attached to said body, a mating fastener element adapted to mate with the first mentioned fastener element in a removably attached relationship adjustably mounted on said strap.

References Cited in the file of this patent

UNITED STATES PATENTS

| | | |
|---|---|---|
| D. 164,570 | Grover | Sept. 18, 1951 |
| 233,275 | Osborn | Oct. 12, 1880 |
| 312,880 | McPherson | Feb. 24, 1885 |
| 791,372 | Seaders | May 30, 1905 |
| 1,683,678 | Kitterman et al. | Sept. 11, 1928 |
| 2,529,163 | Knight | Nov. 7, 1950 |